United States Patent
Cummings et al.

(10) Patent No.: US 11,307,100 B2
(45) Date of Patent: Apr. 19, 2022

(54) GAS TURBINE EXHAUST THERMOCOUPLE ASSEMBLY

(71) Applicants: General Electric Company, Schenectady, NY (US); Gary Nalen, Wilmington, MA (US)

(72) Inventors: Edward W. Cummings, Greenville, SC (US); Mica L. Longwell, Anderson, SC (US); George Martin Gilchrist, Greenville, SC (US); Gary Nalen, Wilmington, MA (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 16/677,725

(22) Filed: Nov. 8, 2019

(65) Prior Publication Data
US 2021/0140834 A1 May 13, 2021

(51) Int. Cl.
| | |
|---|---|
| *G01K 7/00* | (2006.01) |
| *G01K 1/00* | (2006.01) |
| *G01K 13/00* | (2021.01) |
| *G01K 7/02* | (2021.01) |
| *G01K 1/08* | (2021.01) |
| *G01K 13/02* | (2021.01) |
| *G01K 13/024* | (2021.01) |

(52) U.S. Cl.
CPC .............. *G01K 7/02* (2013.01); *G01K 1/08* (2013.01); *G01K 13/02* (2013.01); *G01K 13/024* (2021.01)

(58) Field of Classification Search
USPC .................. 374/179, 208, 148, 138, 144
See application file for complete search history.

(56) References Cited

U.S. PATENT DOCUMENTS

| | | | | |
|---|---|---|---|---|
| 3,589,192 A * | 6/1971 | Sabovik | .............. | G01K 1/146 136/230 |
| 4,499,330 A | 2/1985 | Pustell | | |
| 4,875,782 A * | 10/1989 | Fox | .............. | G01K 1/146 374/148 |
| 5,427,452 A * | 6/1995 | Stuart | .............. | G01K 7/04 136/230 |
| 6,059,453 A * | 5/2000 | Kempf | .............. | G01K 1/08 374/139 |
| 7,004,626 B1 * | 2/2006 | Giberson | .............. | G01K 7/02 136/230 |

(Continued)

FOREIGN PATENT DOCUMENTS

| | | |
|---|---|---|
| FR | 2590980 B1 | 8/1988 |
| WO | WO2019043181 A1 | 3/2019 |

*Primary Examiner* — Mirellys Jagan
(74) *Attorney, Agent, or Firm* — Dority & Manning, P.A.

(57) ABSTRACT

Thermocouple assemblies for high temperature applications are provided. The thermocouple assembly includes a protection tube; and a thermocouple probe within the protection tube. The thermocouple probe includes a cable connector at a first end and extending along a longitudinal axis to a free second end. A protective housing assembly, which extends around the thermocouple probe, extends from the cable connector to a tapered end of the protective housing assembly. The protective housing assembly includes an installation unit having a fixed transition joint. An oversheath extends between the installation unit and the tapered end. The free second end of the thermocouple probe extends along the longitudinal axis beyond the tapered end of the oversheath.

18 Claims, 7 Drawing Sheets

(56) References Cited

U.S. PATENT DOCUMENTS

| | | | |
|---|---|---|---|
| 7,018,096 B2* | 3/2006 | Benjamin | G01K 1/16 |
| | | | 374/141 |
| 2004/0114664 A1* | 6/2004 | Park | G01K 7/02 |
| | | | 374/179 |
| 2014/0355635 A1* | 12/2014 | Iwahashi | H01S 5/11 |
| | | | 372/45.01 |
| 2015/0068281 A1* | 3/2015 | Lyon | G01N 25/00 |
| | | | 73/25.01 |
| 2015/0114443 A1 | 4/2015 | Berkland et al. | |
| 2015/0185084 A1* | 7/2015 | Hatlen | G01K 1/08 |
| | | | 374/208 |
| 2017/0322091 A1* | 11/2017 | Sanchez | G01K 1/08 |
| 2021/0003459 A1* | 1/2021 | Obillo | G01K 7/02 |
| 2021/0123814 A1* | 4/2021 | Schleif | G01K 7/02 |

\* cited by examiner

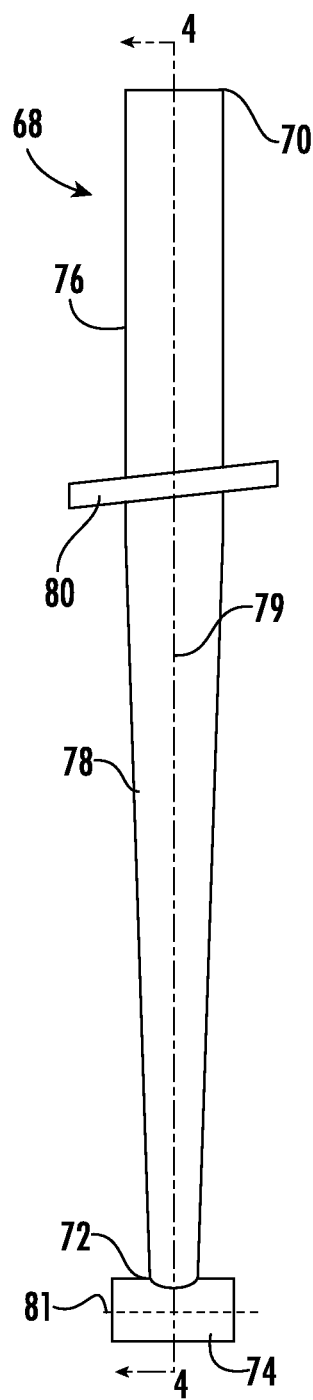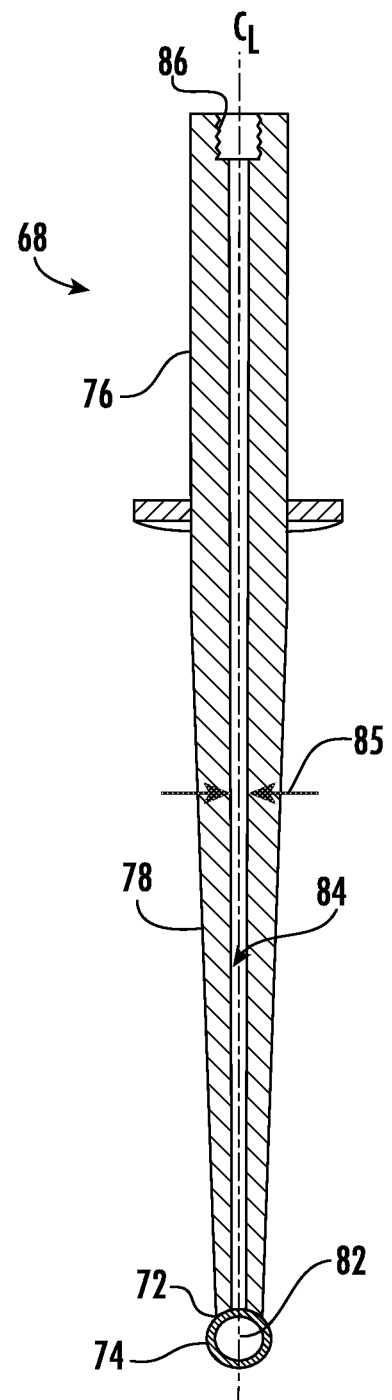
FIG. 3
FIG. 4

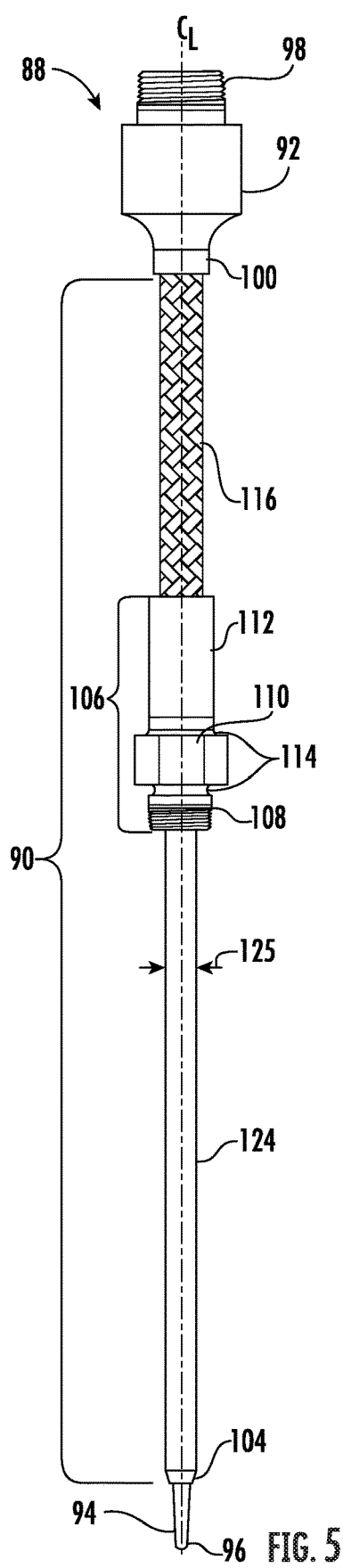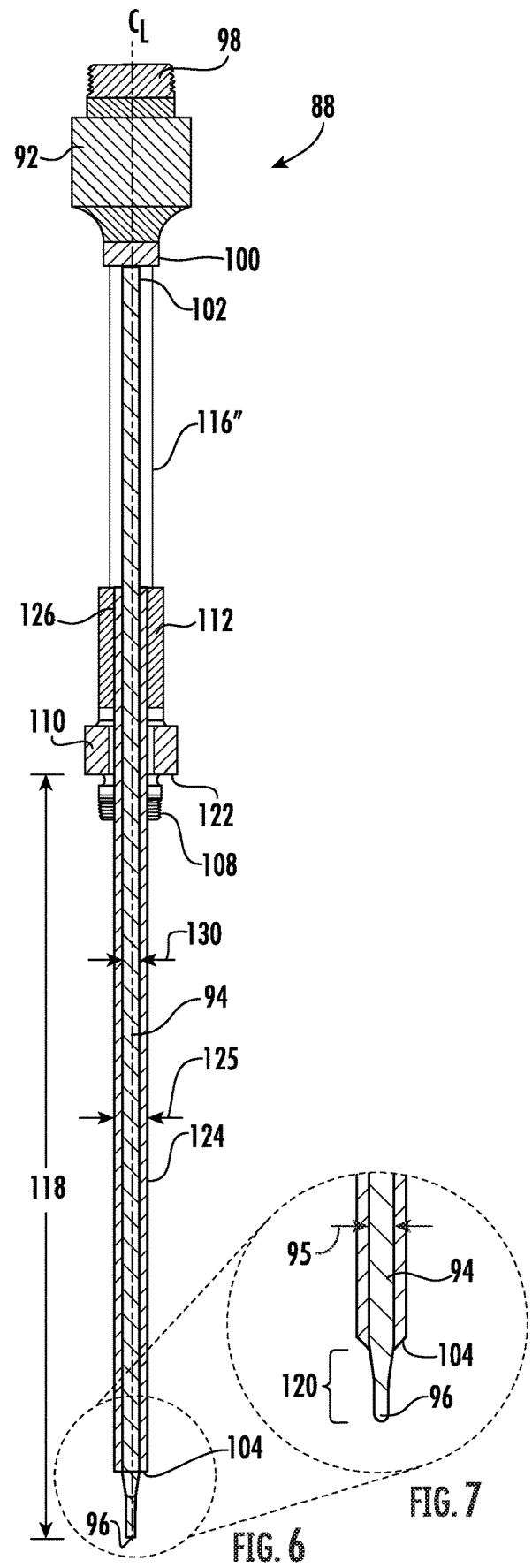

GAS TURBINE EXHAUST THERMOCOUPLE ASSEMBLY

FIELD OF THE TECHNOLOGY

The present disclosure relates generally to an exhaust temperature measuring device for a turbomachine. More specifically, the disclosure is directed to a thermocouple assembly that may be used in a turbomachine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected to a load, e.g., to a generator to produce electricity. The combustion gases then exit the gas turbine via the exhaust section.

Turbomachines are one example of high-temperature applications in which thermocouples are utilized to measure temperatures. Thermocouples are generally utilized to monitor temperatures and are generally formed by creating a junction (typically via welding) between two solid metals (e.g. wires). Exposure of this junction to heat generates an electromagnetic field that is proportional to the temperature. Accordingly, the temperature and fluctuations thereof can be calculated with high accuracy.

Thermocouples may be used in the exhaust section of a turbomachine to measure the temperature fluctuations of the exhaust gasses exiting a turbine. However, many existing thermocouples are prone to fail at high temperatures of the exhaust gas due to, for example, oxidation and/or junction separation. Therefore, the use of a thermocouple protection tube is required in most turbomachine exhaust gas temperature measuring applications to prevent failure of the thermocouple assembly and to prolong its usable life.

Issues exist with the use of known thermocouples and protection tubes. Relative movement, or vibration, between the thermocouple and the protection tube results in inaccuracies or early failure of the thermocouple. In addition, the thermocouples are cumbersome to install and often require two individuals and high precision to ensure proper alignment and control depth is achieved. Errors in the thermocouple installation can result in an improper control depth and misalignments between the protection tube and the thermocouple that only worsen the impact of vibration. Therefore, a thermocouple assembly and protection tube that provide for ease of installation and improved vibration resistance are desired and would be advantageous.

BRIEF DESCRIPTION OF THE TECHNOLOGY

Aspects and advantages of the thermocouple assemblies in accordance with the present disclosure will be set forth in part in the following description, or may be obvious from the description, or may be learned through practice of the technology.

In accordance with one embodiment, a thermocouple assembly is provided. The thermocouple assembly includes a protection tube; and a thermocouple probe positioned within the protection tube. The thermocouple probe is fixedly connected to a cable connector at a first end and extends along a longitudinal axis to a free end opposite the first end. The protective housing assembly at least partially surrounds the thermocouple cable and extends from the cable connector to a tapered end of the protective housing assembly. The protective housing assembly includes an installation unit having a fixed transition joint. An oversheath extends between the installation unit and the tapered end and terminates at the tapered end of the protective housing assembly. The free end of the thermocouple probe extends along the longitudinal axis beyond the tapered end of the oversheath.

In accordance with another embodiment, an exhaust assembly is provided. The exhaust assembly includes an outer wall that defines an interior of the exhaust assembly. The outer wall is configured to receive exhaust gas from at least one turbomachine component and direct the exhaust gas to an atmosphere outside the exhaust assembly. A thermocouple assembly includes a protection tube that extends radially through the outer wall and into the interior of the exhaust assembly. A thermocouple probe is positioned within the protection tube. The thermocouple probe is fixedly connected to a cable connector at a first end and extends along a longitudinal axis to a free end opposite the first end. The protective housing assembly at least partially surrounds the thermocouple cable and extends from the cable connector to a tapered end of the protective housing assembly. The protective housing assembly includes an installation unit having a fixed transition joint. An oversheath extends between the installation unit and tapered end. The oversheath terminates at the tapered end of the protective housing assembly. The free end of the thermocouple probe extends along the longitudinal axis beyond the tapered end of the oversheath.

These and other features, aspects and advantages of the present assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present thermocouple assemblies, including the best mode of making and using the present systems and methods, directed to one of ordinary skill in the art, is set forth in the specification, which makes reference to the appended figures, in which:

FIG. 3 illustrates a side view of the protection tube in accordance with embodiments of the present disclosure;

FIG. 4 illustrates a cross-sectional view of protection tube of FIG. 3 in accordance with embodiments of the present disclosure;

FIG. 5 illustrates a side view of a thermocouple assembly in accordance with embodiments of the present disclosure;

FIG. 6 illustrates a cross-sectional view of the thermocouple assembly shown in FIG. 5 in accordance with embodiments of the present disclosure;

FIG. 7 illustrates an enlarged view of a portion of the thermocouple assembly in accordance with embodiments of the present disclosure;

DETAILED DESCRIPTION

Figure 1:
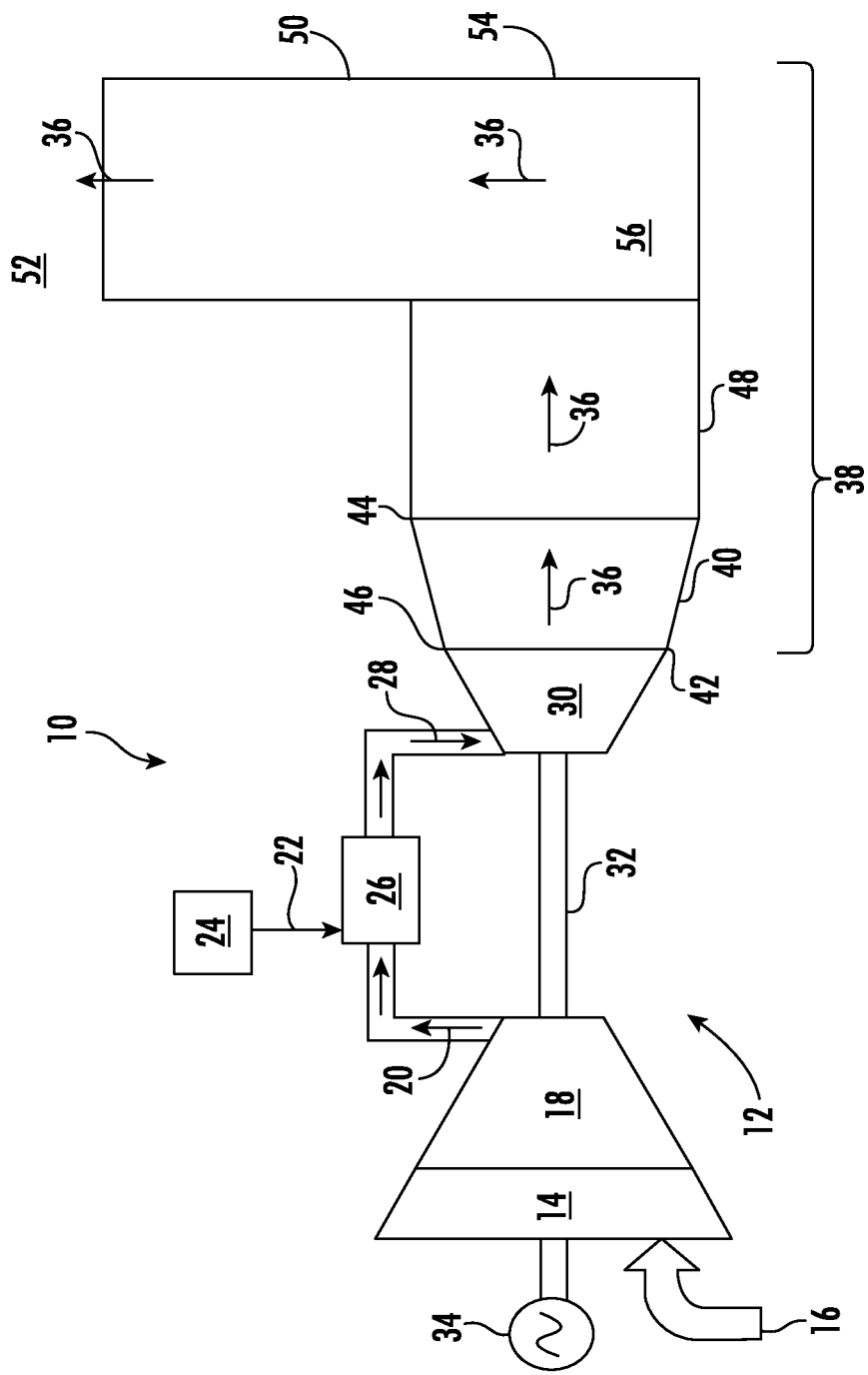
FIG. 1 illustrates a functional block diagram view of an exemplary power plant in accordance with embodiments of the present disclosure.

Reference now will be made in detail to embodiments of the present assemblies, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel to and/or coaxially aligned with an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 provides a functional block diagram of an exemplary power plant 10 that may incorporate various embodiments of the present invention. As shown, the power plant 10 generally includes a gas turbine 12. Although an industrial or land-based gas turbine is shown and described herein, the present disclosure is not limited to a land based and/or industrial gas turbine unless otherwise specified in the claims. For example, the exhaust temperature device, as described herein, may be used in any type of turbomachine including, but not limited to, a steam turbine, an aircraft gas turbine, or a marine gas turbine.

The gas turbine 12 includes an inlet section 14 that may have a series of filters, cooling coils, moisture separators, and/or other devices to purify and otherwise condition a working fluid (e.g., air) 16 entering the gas turbine 12. In operation, the working fluid 16 flows through the inlet section 14 and into a compressor 18. The compressor 18 progressively imparts kinetic energy to the working fluid 16 to produce a compressed working fluid 20 at a highly energized state.

The compressed working fluid 20 is mixed with a fuel 22 from a fuel supply system 24 to form a combustible mixture within one or more combustors 26 of the gas turbine 12. The combustible mixture is burned to produce combustion gases 28 having a high temperature and pressure. The combustion gases 28 flow through a turbine 30 of the gas turbine 12 to produce work. For example, the turbine 30 may be connected to a shaft 32 so that rotation of the turbine 30 drives the compressor 18 to produce the compressed working fluid 20. Alternately, or in addition, the shaft 32 may connect the turbine 30 to a generator 34 for producing electricity. In some embodiments, the compressor 18 and turbine 30 both spin on one shaft 32. In other embodiments, compressor 18 and turbine 30 may spin on separate, but concentric, shafts 32 and at different speeds.

An exhaust assembly 38 connects, either directly or indirectly, to the turbine 30. The exhaust assembly 38 may include an outer wall 54 that defines an interior 56 through which the exhaust gases 36 flow to an atmosphere 52 outside the exhaust assembly 38.

The exhaust assembly 38 may further include an exhaust diffuser 40 having an inlet 42 operably coupled to the outlet 46 of the turbine 30 and an outlet 44 coupled to an exhaust transition 48. The exhaust transition 48 may also be coupled to an exhaust stack 50. Exhaust gases 36 may flow from the outlet 46 of the turbine 30, through the exhaust diffuser 40, into the exhaust transition 48. In the exhaust transition 48, the exhaust gases 36 transition form flowing substantially horizontal to substantially vertical upon entering the exhaust stack 50. The exhaust gases 30 flow vertically up the exhaust stack 50 to an atmosphere 52 outside the exhaust assembly 38.

Figure 2:
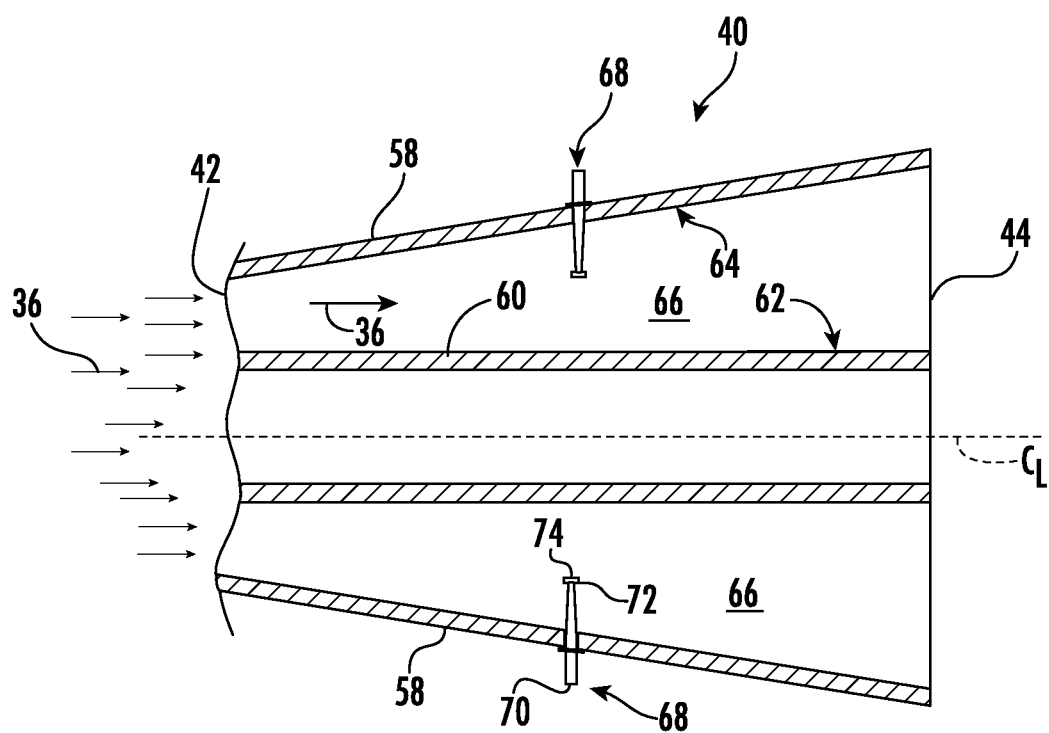
FIG. 2 illustrates a cross-sectional view of an exhaust assembly diffuser showing a protection tube coupled thereto in accordance with embodiments of the present disclosure.

Referring now to FIG. 2, a cross-sectional side view of an example exhaust diffuser 40 is illustrated. Exhaust diffuser 40 includes an inlet 42 axially spaced, or upstream, from an outlet 44 and a diffuser wall 58 that extends between the inlet 42 and the outlet 44. The diffuser wall 58 may diverge radially outwardly from the inlet 42 to the outlet 44 with respect to an axial centerline of the diffuser 40. The diffuser wall 58 circumferentially surrounds an inner barrel 60. More specifically, an inner surface 64 of the diffuser wall 58 circumferentially surrounds an outer surface 62 of inner barrel 60, such that the inner surface 64 of the diffuser wall 58 and the outer surface 62 of inner barrel 60 define a diffuser interior 66. The exhaust gases 36 flow substantially axially through the diffuser interior 66.

A protection tube 68 extends through the diffuser wall 58 and into the diffuser interior 66. The protection tube 68 includes a first end 70, a second end 72, and a radiation shield 74 disposed on the second end 72. The radiation shield 74 may be substantially tubular or shaped as a substantially hollow cylinder and oriented axially in parallel with the axial centerline of the diffuser (as shown in FIGS. 3 and 4). The radiation shield 74 provides a passageway through which exhaust gases 36 flow when the protection tube 68 is installed in the interior 56 of the exhaust assembly 38. Further, the radiation shield 74 prevents erroneous temperature measurements by blocking the thermocouple probe 94 from the radiation within the exhaust assembly 38. Protection tube 68 may be one of a plurality of protection tubes 68 spaced apart in a circumferential array along the diffuser wall 58.

Although FIG. 2 shows protection tube 68 extending into the exhaust diffuser 40, protection tube 68 may be utilized in any portion of the exhaust assembly 38, e.g., the exhaust transition 48 or the exhaust stack 50. The flow direction of exhaust gases 36 may dictate the orientation of protection tube 68 and radiation shield 74 within the exhaust assembly 38. The center axis 81 of the radiation shield 74 may be substantially parallel to the flow of exhaust gases 36 within the interior 56 of the exhaust assembly 38.

FIGS. 3 and 4 provide a side view and a cross-sectional view of protection tube 68, respectively. The protection tube 68 functions to protect the thermocouple sub-assembly 88 from the high temperature of the exhaust gases 36 within the exhaust assembly 38. Further, as shown in FIGS. 8 and 9, the protection tube 68 enables the thermocouple sub-assembly 88 to safely pass into the interior 56 of the exhaust assembly 38 to obtain temperature measurements of the exhaust gases 36 passing therethrough.

Protection tube 68 may include a tubular portion 76, a tapered portion 78, and a mounting washer 80. The tubular portion 76 may extend from the first end 70 to the mounting washer 80 and may be disposed outside of the exhaust assembly 38, when installed (as shown in FIG. 8). The tubular portion 76 may be shaped as a hollow cylinder with a uniform outer diameter. In some embodiments, as shown in FIG. 9, the tubular portion 76 may be omitted.

Figure 8:
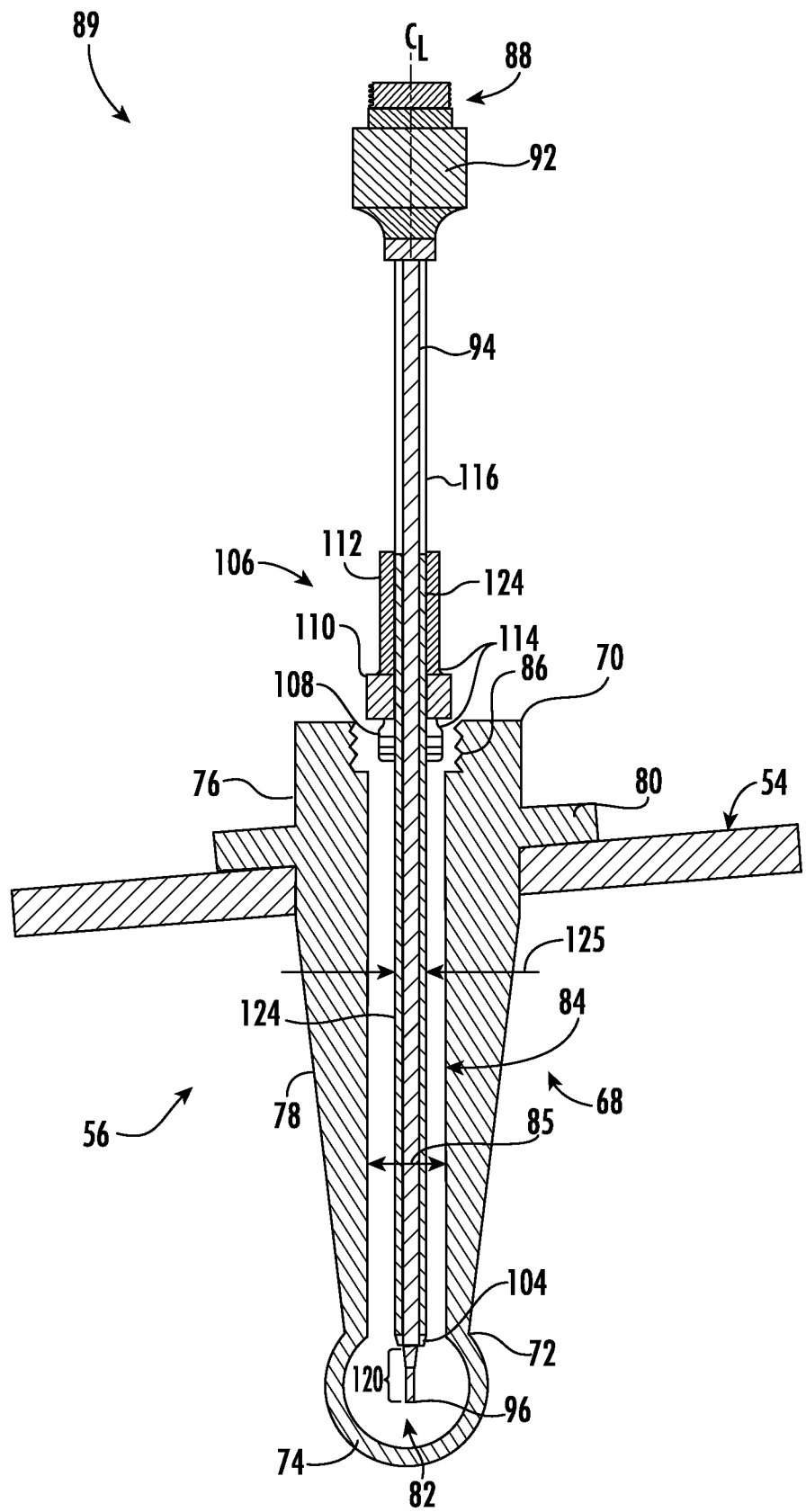
FIG. 8 illustrates a cross-sectional assembled view of the protection tube of FIG. 4 and the thermocouple assembly of FIG. 6 in accordance with embodiments of the present disclosure.
Figure 9:
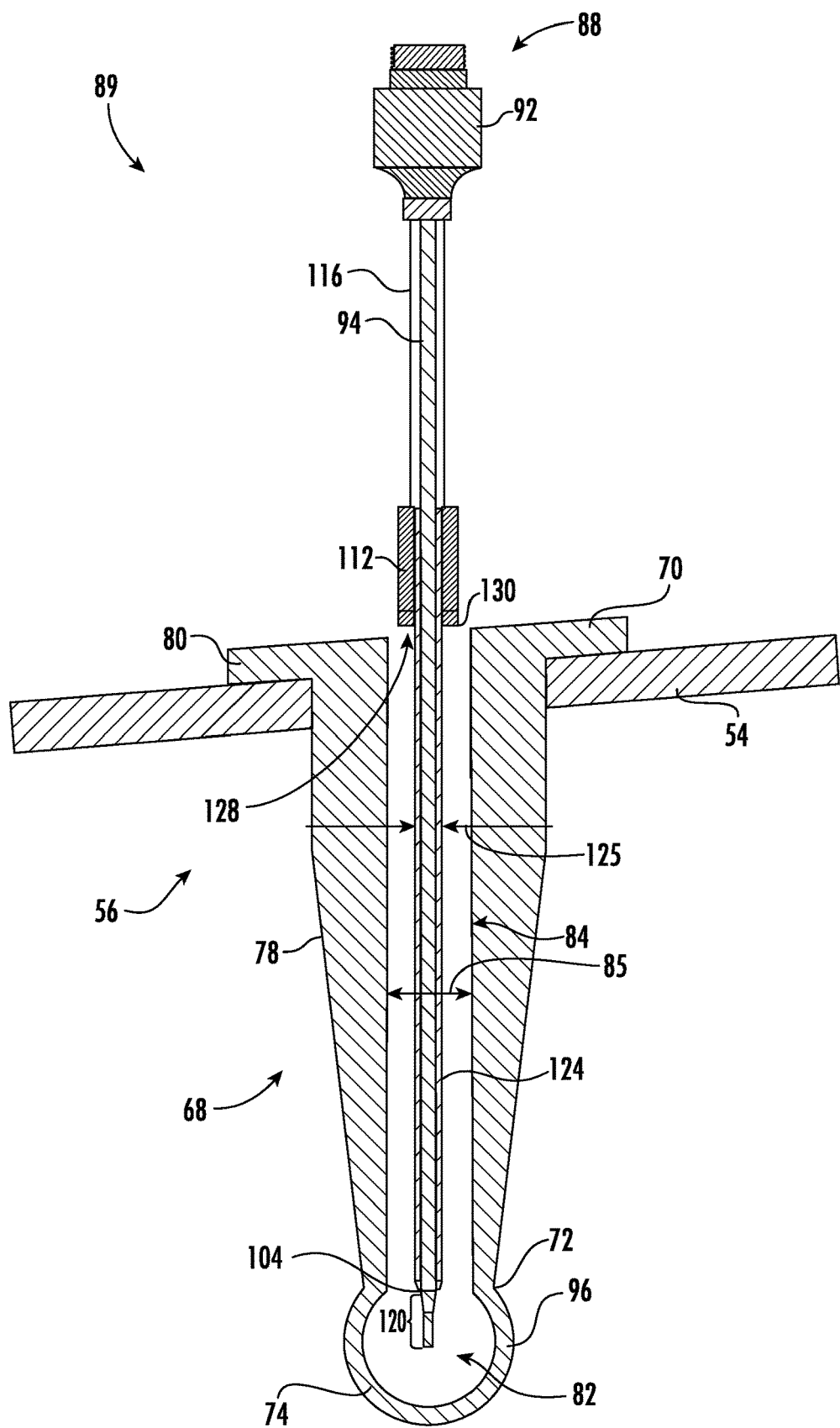
FIG. 9 illustrates another cross-sectional assembled view of the protection tube and the thermocouple assembly in accordance with other embodiments of the present disclosure.

The tapered portion 78 may extend from the mounting washer 80 to the second end 72 and/or radiation shield 74 and may be disposed within the interior 56 of the exhaust assembly 38 or the diffuser interior 66 (as shown in FIGS. 8 and 9). The tapered portion 78 may converge radially inward from the mounting washer 80 to the second end 72 along the centerline of protection tube 68. In some embodiments, the protection tube 68 may be fully tubular or cylindrical, fully conical, or other shapes. For example, protection tube 68 may have any cross-sectional shape that extends between first end 70 and second end 72. In some embodiments, different sections of the protection tube 68 may have different cross-sectional shapes.

In some embodiments, such as the one shown in FIGS. 3 and 4, mounting washer 80 may be positioned between the tubular portion 76 and the tapered portion 78. In other embodiments, mounting washer 80 may be positioned at the first end 70 of the protection tube (as in FIG. 9). The mounting washer 80 may be integrally joined with protection tube 68 and may extend from the outer surface of the protection tube 68 in a radially outwardly direction, relative to the axial centerline of protection tube 68. The mounting washer 80 may also be coupled to the protection tube 68 at any angle necessary to achieve a secure connection to the exhaust assembly 38. Mounting washer 80 may be bolted, welded, or otherwise coupled to the outer surface 54 of the exhaust assembly 38 to allow the protection tube 68 to extend securely into the interior 56 of the exhaust assembly 38. In some embodiments, the mounting washer 80 may be coupled to an interior surface of outer wall 56 of the exhaust assembly 38.

As seen in FIG. 4, the protection tube 68 further includes an inner surface 84 having an inner diameter 85 and a counterbore 86. The counterbore 86 may extend from the first end 70 to the inner surface 84. In some embodiments, such as those shown in FIGS. 4 and 8, the inner surface 84 extends from the counterbore 86 to the second end 72. In another embodiment, as shown in FIG. 9, the inner surface 84 extends the entire length of the protection tube, i.e, from the first end 70 to the second end 72. Except for the counterbore 86 (when present), the inner surface 84 may have a constant diameter along the centerline or longitudinal axis 79 of the protection tube 68.

FIGS. 5 and 6 provide, respectively, a side view and a cross-sectional view of a thermocouple sub-assembly 88 including a protective housing assembly 90, a cable connector 92, and a thermocouple probe 94. The entire thermocouple probe 94 may be made from a highly thermally resistant, mineral-insulated housing. The thermocouple probe 94 may include a pair of thermocouple wires disposed within the mineral-insulated housing. The thermocouple probe 94 may define an outer diameter 95 along almost an entirety of its length (i.e., excluding a free end 96 that may taper). The thermocouple probe 94 may be fixedly connected to the cable connector 92 and may extend through the entire protective housing assembly 90 to the free end 96. The cable connector 92 may further include a threaded first end 98 and a second end 100 fixedly connected to a first end 102 of the thermocouple probe 94. In other embodiments, the cable connector 92 may be any commercially available thermocouple connector.

The protective housing assembly 90 may extend from the cable connector 92 to a tapered end 104 of the protective housing assembly 90. The protective housing assembly 90 circumferentially surrounds, or houses, the entire thermocouple probe 94. The protective housing assembly 90 may include an installation unit 106 having a threaded portion 108, a nut 110, and a transition joint 112. The nut 110 may be positioned between, and fixedly connected to, the threaded portion 108 and the transition joint 112 of the installation unit 106. For example, the nut 110 may be fixedly connected to the threaded portion 108 and the transition joint 112 by braze joints or weld joints 114. In other embodiments, the nut 110 and the threaded portion 108 may be machined as one piece and fixedly connected to the transition joint 112. The entire installation unit 106 may thereby rotate together with the nut 110 during installation into the counterbore 86 of the protection tube 68. In some embodiments, the nut 110 may rotate independently from the transition joint 112 and the threaded portion 108.

The protective housing assembly 90 further includes a protection cover 116 extending from the second end 100 of the cable connector 92 to the transition joint 112. The protection cover 116 may be fixedly connected to both the cable connector 92 and the transition joint 112. The protection cover 116 may be made from a highly thermally resistive braided metal. The protection cover 116 may be, for example, a flexible conduit, a braided sheath, or an armored cable covering. Further, the protection cover 116 may be continuous from the cable connector 92 to the transition joint 112. The protection cover 116 provides heat and damage protection to the thermocouple probe 94, which is at least partially housed inside. Further, the protection cover 116 allows for substantially flexible movement without damaging the thermocouple probe 94 that is contained inside. For example, the protection cover 116 may bend and flex without damaging the thermocouple probe 94. In many embodiments, the protection cover 116 may be from about one inch to about six feet in length. In some embodiments, the protection cover 116 may be from about one foot to about five feet in length. In other embodiments, the protection cover 116 may be about three feet in length.

As shown in FIGS. 5 and 6, the protective housing assembly 90 may also include an oversheath 124 extending from the installation unit 106 toward the free end 96 of the thermocouple probe 94. The oversheath 124 defines the tapered end 104 of the protective housing 90 and terminates at said tapered end 104. In some embodiments, tapered end 104 may diverge radially inward with respect to the centerline of the thermocouple sub-assembly 88. In other embodiments, tapered end 104 may be a square cut end, a swaged end, or otherwise an end that converges at least slightly inward with respect to the centerline of the thermocouple sub-assembly 88. The oversheath has a first end 126 that extends into and is coupled to the installation unit 106. The first end 126 the oversheath 124 may be positioned radially between the installation unit 106 and the thermocouple probe 94. In some embodiments, the oversheath 124 is positioned directly radially outwardly from at least a portion of the thermocouple probe 94 with respect to an axial centerline of the thermocouple sub-assembly 88. Additionally, the installation unit 106 is positioned directly radially outwardly from at least a portion of the oversheath 124 with respect to an axial centerline or longitudinal axis of the thermocouple sub-assembly 88.

In some embodiments, such as those shown in FIGS. 5 and 6, the oversheath 124 may be continuous along the centerline of the thermocouple sub-assembly 88, the centerline defining a longitudinal axis of the thermocouple sub-assembly 88. In such embodiments, the oversheath 124 may be between about 6 inches and about 36 inches in length. In other embodiments, the oversheath 124 may be between about 10 inches and about 20 inches in length. Yet still in other embodiments, the oversheath may be between about 14 inches and about 18 inches in length. In other embodiments, the oversheath 124 may be discontinuous along the centerline or longitudinal axis 79 of the thermocouple sub-assembly 88 (as in FIG. 10). For example, the oversheath 124 may be discontinuous cylindrical or spherical dampers integrally formed on the thermocouple probe 94.

In FIGS. 5 and 6, the thermocouple probe 94 further defines a control depth 118. In some embodiments, the control depth 118 may be between about six inches and about thirty-six inches. The control depth 118 may be the length of the portion of the thermocouple probe 94 that is housed within the protection tube 68 and the radiation shield 74 (as in FIG. 8). The control depth 118 may be defined between a bottom surface 122 of nut 110 and the free end 96 of thermocouple probe 94. FIG. 7 illustrates an enlarged view of a tapered portion 120 of thermocouple probe 94 and the tapered end 104 of the oversheath 124. The tapered portion 120 of the thermocouple probe 94 may be restricted from movement along the axial direction due to the tapered end of oversheath 124. The free end 96 may extend beyond the tapered end 104 of the oversheath 124.

In practice, a thermocouple probe 94 having a tapered portion 120 may be inserted into an oversheath 124 until the tapered portion 120 of the thermocouple probe nears the tapered end 104 of the oversheath 124 and is restricted from further movement. Thus, the oversheath 124 may prevent over insertion of the thermocouple probe 94 therein due to its tapered end 104. Further, the oversheath 124 prevents misalignment of the thermocouple probe 94 within the protection tube 68.

FIG. 8 illustrates a partially assembled cross-sectional view of a thermocouple assembly 89. The thermocouple assembly 89 includes the thermocouple sub-assembly 88 and a protection tube 68. When assembled as in FIG. 8, the thermocouple sub-assembly 88 and the protection tube 68 share a common axial centerline or longitudinal axis 79. As seen in FIG. 8, the thermocouple sub-assembly 88 may be positioned within the protection tube 68. More specifically, the length of the thermocouple sub-assembly 88 that defines the control depth 118 (FIG. 6) may be positioned within the protection tube 68 and extend into the radiation shield 74. The oversheath 124 may be housed within the inner surface 84 of the protection tube 68. Specifically, the oversheath 124 may be positioned directly radially inward of the inner surface 84 of the protection tube 68 with respect to the axial centerline or longitudinal axis 79. The oversheath 124 may define an inner diameter 130 and an outer diameter 125. The outer diameter 125 of the oversheath 124 may be sized to prevent damaging movement or vibration within the inner surface 84 of the protective tube 68 during operation of turbine 30.

For example, in some embodiments, the outer diameter 125 of the oversheath 124 may be between about 80% and 99% of the inner diameter 85 of the protection tube 68. In other embodiments, the outer diameter 125 of the oversheath 124 may be between about 85% and 99% of the inner diameter 85 of the protection tube 68. Yet still in other embodiments, the outer diameter 125 of the oversheath 124 may be between about 90% and 99% of the inner diameter 85 of the protection tube 68. In some embodiments, the outer diameter 125 of the oversheath 124 may be between about 95% and 99% of the inner diameter 85 of the protection tube 68. In some embodiments, the outer diameter 125 of the oversheath 124 may be about 95% of the inner diameter 85 of the protection tube 68.

Further, the relationship between the outer diameter 95 of the thermocouple probe 94, the outer diameter 125 of the oversheath 124, and the inner diameter 85 of the protection tube 68 may be shown by the following equation:

Thermocouple Probe OD<Oversheath OD<Protection Tube ID

The outer diameter 125 of the oversheath 124 is greater than the outer diameter 95 of the thermocouple probe 94 and less than the inner diameter 85 of the protection tube 68. Further, although in some embodiments the outer diameter 95 of the thermocouple probe 94, the outer diameter 125 of the oversheath 124, and the inner diameter 85 of protection tube 68 may have circular cross-sections, other embodiments may include cross-sections having square, rectangle, oval, or other polygonal shapes.

The tapered portion 120 of the thermocouple probe 94 may extend axially along the centerline beyond both the tapered end 104 of the oversheath 124 and the second end 72 of the protection tube 68 and into the radiation shield 74. The tapered portion 120 and the free end 96 of the thermocouple probe 94 may be disposed within the flow path 82 of the radiation shield 74, where the free end 96 is exposed to exhaust gases 36. The tapered portion 120 of thermocouple probe 94 functions to obtain temperature measurements of the exhaust gases 36 flowing through the interior 56 of the exhaust assembly 38.

The thermocouple sub-assembly 88 may be installed into the protection tube 68 by the installation unit 106. More specifically, the threaded portion 108 of the installation unit 106 may threadably couple the thermocouple sub-assembly 88 to the counterbore 86 of the protection tube. When installing the thermocouple sub-assembly 88 into the counterbore 86 of the protection tube 68, the entire thermocouple sub-assembly 88 may rotate with the installation unit 106 due to the fixed connection between components of the installation unit 106, e.g., the braze joint or weld joint 114. Alternatively, the nut 110 may be a spinning male nut that rotates independently of the rest of the thermocouple sub-assembly 88.

FIG. 9 illustrates another embodiment of the thermocouple assembly 89. In this embodiment, the mounting washer 80 may be positioned at the first end 70 of the protection tube 68. The mounting washer 80 may be integrally joined with protection tube 68 and may be coupled to the protection tube 68 at any angle necessary to allow for a secure connection to the outer wall 54 of the exhaust assembly 38.

Further regarding the embodiment shown in FIG. 9, the installation unit 106 of the thermocouple assembly only includes a transition joint 112. Likewise, the protection tube 68 does not include a counterbore 86. Rather, the inner surface 84 extends across the full length of the protection tube 68 from the first end 70 to the second end 72. The bottom surface 128 of transition joint 112 may be fixedly coupled to the mounting washer 80 of the protection tube 68, as represented by a connection 130, thereby integrally joining the thermocouple sub-assembly 88 with the protection tube 68. For example, the connection 130 may be a welded or brazed joint to secure the transition joint 112 to the mounting washer 80. Alternatively, or additionally, the tapered portion 120 of the thermocouple probe 94 may be fixedly coupled to protection tube 68 at the second end 72 and/or the radiation shield 74. The mounting washer 80 may be removably coupled to an outer surface of the outer wall 54 of the exhaust assembly. Integrally joining the thermocouple sub-assembly 88 to the protection tube 68 is advantageous because it allows the entire assembly to be easily removed and replaced by a technician, thereby reducing installation errors.

Figure 10:
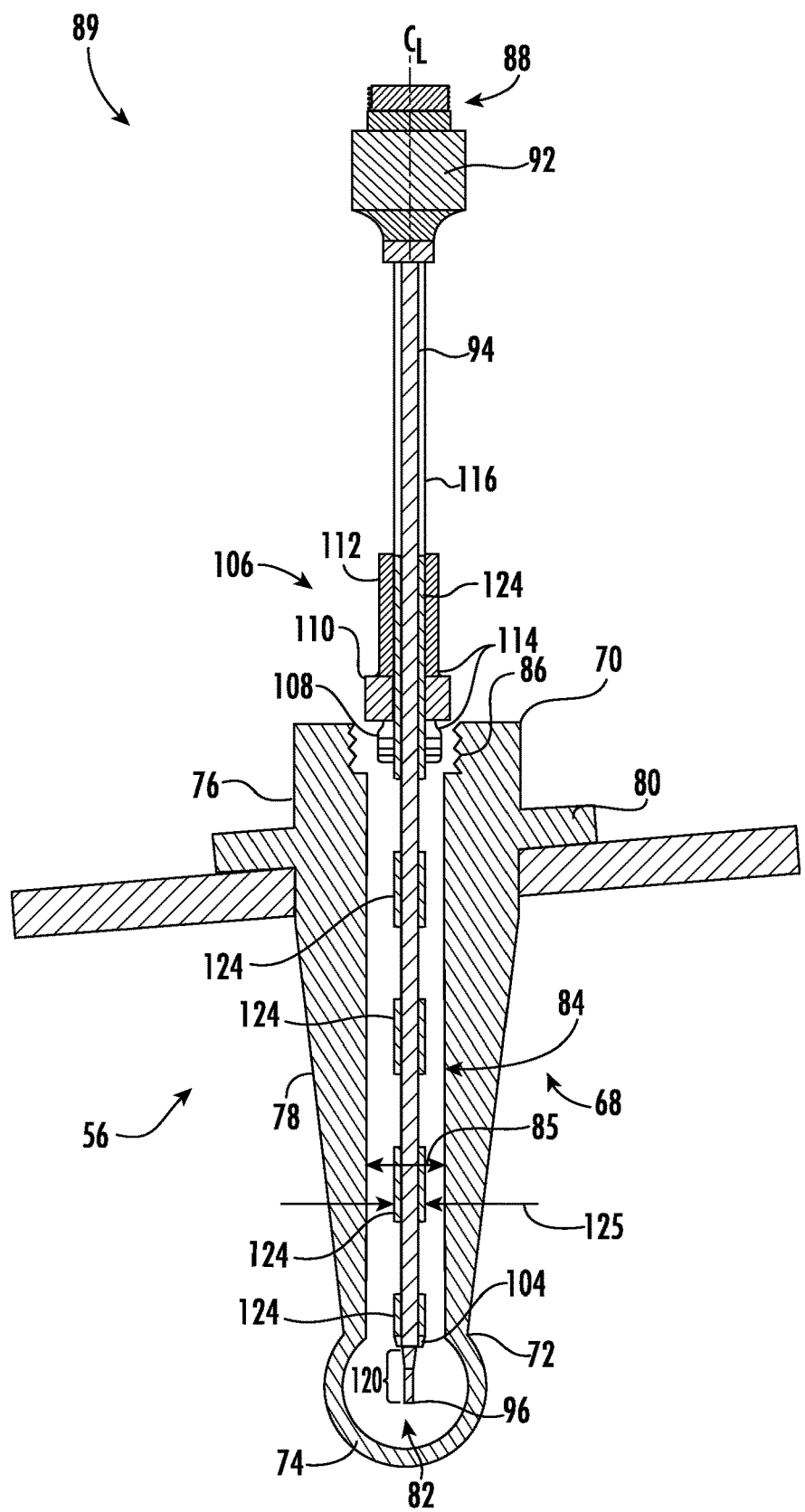
FIG. 10 illustrates another cross-sectional view of an embodiment of the thermocouple assembly.

FIG. 10 illustrates yet another embodiment of the thermocouple assembly 89. In this embodiment, the oversheath 124 may be discontinuous along the centerline of the thermocouple sub-assembly 88. For example, the oversheath 124 may be discontinuous cylindrical dampers integrally formed on the outer diameter 95 of thermocouple probe 94.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A thermocouple assembly comprising:
a protection tube;
a thermocouple probe positioned within the protection tube, the thermocouple probe fixedly connected to a cable connector at a first end and extending along a longitudinal axis to a free end opposite the first end;
a protective housing assembly at least partially surrounding the thermocouple probe, the protective housing assembly extending from the cable connector to a tapered end of the protective housing assembly, the protective housing assembly comprising:
an installation unit having a fixed transition joint, a nut, and a threaded portion, the nut being disposed between the threaded portion and the fixed transition joint; and
an oversheath extending between the installation unit and the tapered end;
wherein the oversheath terminates at the tapered end of the protective housing assembly; and
wherein the free end of the thermocouple probe extends along the longitudinal axis beyond the tapered end.

2. The thermocouple assembly of claim 1, wherein the protective housing assembly further comprises a protection cover extending from the fixed transition joint to the cable connector.

3. The thermocouple assembly of claim 1, wherein the oversheath is continuous along a longitudinal direction parallel to the longitudinal axis.

4. The thermocouple assembly of claim 1, wherein the protection tube has a constant inner diameter; wherein the oversheath defines an outer diameter; and wherein the outer diameter of the oversheath is between about 80% and 99% of the constant inner diameter of the protection tube.

5. The thermocouple assembly of claim 1, wherein the protection tube comprises a mounting washer extending radially outward from an outer surface of the protection tube and a tapered portion extending from the mounting washer toward a second end of the protection tube.

6. The thermocouple assembly of claim 1, wherein the thermocouple probe defines a control depth between the nut and the free end, the control depth being between about six inches and about thirty-six inches.

7. The thermocouple assembly of claim 1, wherein the protection tube comprises a counterbore; and wherein the threaded portion is threadingly coupled to the counterbore to set a control depth of the thermocouple assembly within the protection tube.

8. The thermocouple assembly of claim 1, wherein the oversheath is discontinuous along a longitudinal direction parallel to the longitudinal axis.

9. The thermocouple assembly of claim 8, wherein the fixed transition joint is fixedly connected to the protection tube.

10. An exhaust assembly comprising:
an outer wall defining an interior of the exhaust assembly, the outer wall configured to receive exhaust gas from at least one turbomachine component and to direct the exhaust gas to an atmosphere outside the exhaust assembly;
a thermocouple assembly comprising:
a protection tube extending radially through the outer wall and into the interior of the exhaust assembly;
a thermocouple probe positioned within the protection tube, the thermocouple probe fixedly connected to a cable connector at a first end and extending along a longitudinal axis to a free end opposite the first end;
a protective housing assembly at least partially surrounding the thermocouple probe, the protective housing assembly extending from the cable connector to a tapered end of the protective housing assembly, the protective housing assembly comprising:
- an installation unit having a fixed transition joint, a nut, and a threaded portion, the nut being disposed between the threaded portion and the fixed transition joint; and
- an oversheath extending between the installation unit and the tapered end;
- wherein the oversheath terminates at the tapered end of the protective housing assembly; and
- wherein the free end of the thermocouple probe extends along the longitudinal axis beyond the tapered end.

11. The exhaust assembly of claim 10, wherein the protective housing assembly further comprises a protection cover extending from the fixed transition joint to the cable connector.

12. The exhaust assembly of claim 10, wherein the oversheath is continuous along a longitudinal direction parallel to the longitudinal axis.

13. The exhaust assembly of claim 10, wherein the protection tube has a constant inner diameter; wherein the oversheath defines an outer diameter; and wherein the outer diameter of the oversheath is between about 80% and 99% of the constant inner diameter of the protection tube.

14. The exhaust assembly of claim 13, wherein the fixed transition joint is fixedly connected to the protection tube.

15. The exhaust assembly of claim 10, wherein the protection tube comprises a mounting washer extending radially outward from an outer surface of the protection tube, and a tapered portion extending from the mounting washer toward a second end of the protection tube, and wherein the mounting washer is secured to the outer wall.

16. The exhaust assembly of claim 15, wherein the protection tube comprises a tubular portion extending from the mounting washer away from the second end of the protection tube.

17. The exhaust assembly of claim 10, wherein the thermocouple probe defines a control depth between the nut and the free end, the control depth being between about six inches and about thirty-six inches.

18. The exhaust assembly of claim 17, wherein the protection tube comprises a counterbore; and wherein the threaded portion is threadingly coupled to the counterbore to set the control depth of the thermocouple assembly within the protection tube.

* * * * *